United States Patent
Sezai

[19]

[11] Patent Number: 6,163,293
[45] Date of Patent: Dec. 19, 2000

[54] RADIO WAVE RECEIVING APPARATUS HAVING AN IMPROVED ANTENNA RESOLUTION

[75] Inventor: Toshihiro Sezai, Abiko, Japan

[73] Assignee: National Space Development Agency of Japan, Tokyo, Japan

[21] Appl. No.: 09/272,617

[22] Filed: Mar. 19, 1999

[30] Foreign Application Priority Data

Mar. 23, 1998 [JP] Japan .................................. 10-092206

[51] Int. Cl.[7] ...................................................... G01S 13/00
[52] U.S. Cl. ............................................ 342/196; 342/25
[58] Field of Search ..................................... 342/368, 372,
342/371, 400, 408, 428, 367, 25, 196

[56] References Cited

U.S. PATENT DOCUMENTS

| | | | |
|---|---|---|---|
| 4,617,570 | 10/1986 | Gutleber | 342/367 |
| 5,532,699 | 7/1996 | Smith | 342/195 |
| 5,608,404 | 3/1997 | Burns et al. | 342/25 |
| 5,943,006 | 8/1999 | Crane et al. | 342/196 |

OTHER PUBLICATIONS

Copy of European Patent Office Communication for European Patent Application No. 99302116, including European Search Report dated Dec. 21, 1999.

*Primary Examiner*—Thomas H. Tarcza
*Assistant Examiner*—Fred H. Mull
*Attorney, Agent, or Firm*—Armstrong, Westerman, Hattori, McLeland & Naughton

[57] ABSTRACT

A radio wave receiving apparatus including having improved antenna resolution. The apparatus includes a signal processing circuit; a circuit for performing the Fourier transform with respect to an azimuth of an electric field signal outputted from an antenna receiving circuit; a circuit for performing the Fourier transform with respect to an azimuth of the antenna pattern of an antenna; a circuit for dividing the Fourier transform signal resulting from the electric field signal by the antenna pattern Fourier transform signal; and a circuit for passing the divided signal through a low-pass filter in respect of azimuthal frequency and then subjecting it to a Fourier inverse transform in respect of azimuth, so as to output the signal after the Fourier inverse transform as a final antenna output, thereby improving the antenna resolution by using a transfer function in the azimuthal frequency domain resulting from the Fourier transform of the antenna pattern with respect to an azimuth.

4 Claims, 3 Drawing Sheets

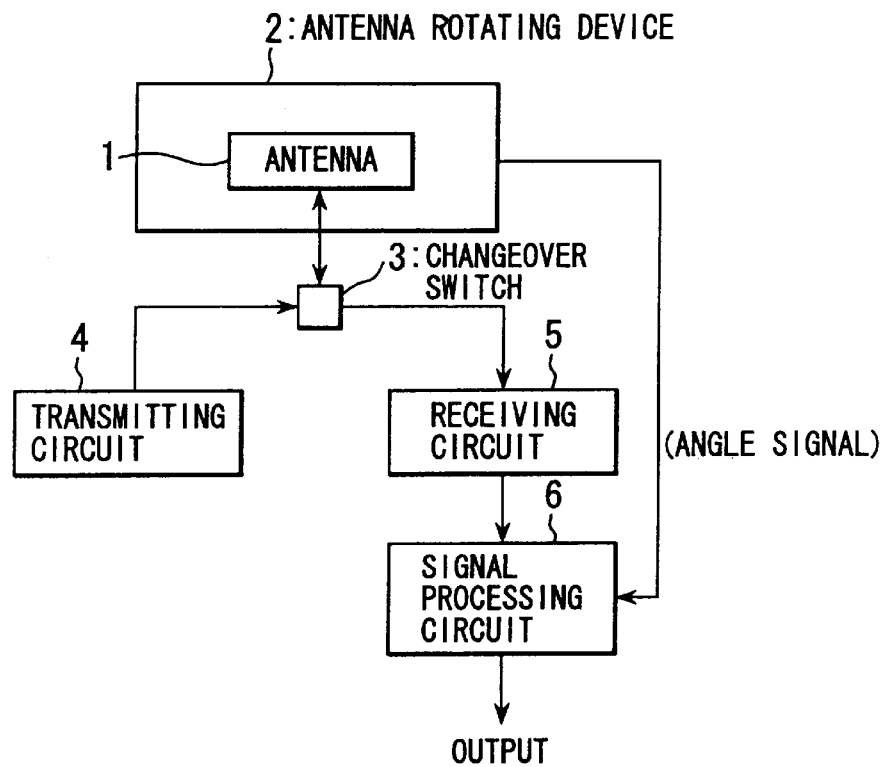
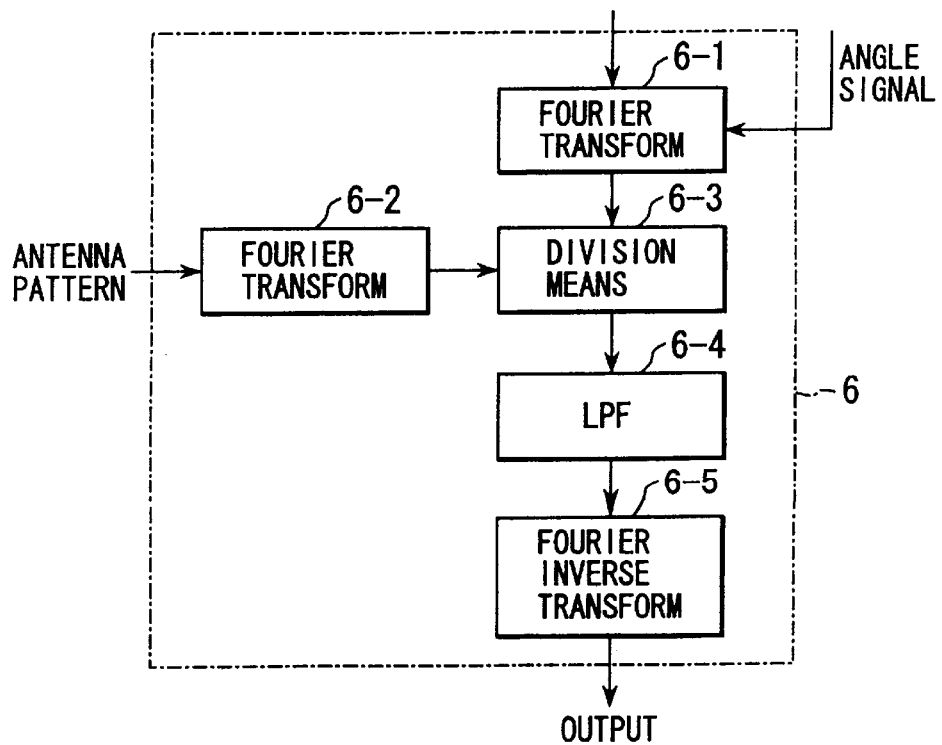

RADIO WAVE RECEIVING APPARATUS HAVING AN IMPROVED ANTENNA RESOLUTION

BACKGROUND OF THE INVENTION

1. Field of the Invention

The present invention relates to a radio wave receiving apparatus in which antenna resolution is improved by using a transfer function in the azimuthal frequency domain of an antenna pattern.

2. Description of the Related Art

When observing target objects, for example, in using a radar, a method has been generally used in which the pointing direction of an antenna beam is changed, for example, by rotating the antenna to receive radio waves from the respective azimuths pointed at by the antenna beam, so as to observe the intensity of the received radio wave (antenna response) with respect to the azimuths. In doing so, the use of an antenna with a narrower beamwidth results in an antenna response approximating the distribution of the radio wave sources and, hence, improves the azimuth resolution of the radar. In the prior art, in order to, improve antenna resolution, it is necessary to obtain an antenna response which more closely approximates the distribution of the radio sources. Although another method is also known, such as in a synthetic aperture radar where antenna resolution is improved by subjecting the received radio wave to signal processing, this method, too, intends to obtain an antenna response approximating the distribution of the radio wave sources by achieving, through signal processing, and effect equivalent to that of reducing the antenna beamwidth.

The above conventional technique for improving the antenna resolution is a method of indirectly obtaining the distribution of the radio wave sources from the antenna response and there is a problem in that the distribution of the radio wave sources cannot be directly obtained. If there existed an antenna having its pattern represented by the Dirac delta function, the antenna response of such an antenna would correspond to the response of the radio wave sources. It is known from antenna theory, however, that an antenna having such a pattern does not exist. Accordingly, since an actual antenna pattern has a finite beamwidth and sidelobes, there is a problem that the distribution of the observable radio wave sources is distorted by the antenna pattern.

SUMMARY OF THE INVENTION

To eliminate the above problems in the conventional case of obtaining the radio wave distribution from an antenna response, it is an object of the present invention to provide a radio wave receiving apparatus capable of directly obtaining the radio wave source distribution.

To solve the above problems, a radio wave receiving apparatus including an antenna for receiving radio waves and a means for moving the pointing direction of an antenna beam of the antenna toward directions for improving resolution is provided in accordance with the present invention, comprising: a means for performing a Fourier transform with respect to an azimuth of a received electric field signal obtained from the antenna while moving the antenna beam; a means for performing a Fourier transform with respect to an azimuth of a received electric field pattern in the presence of one point source of wave of the antenna; a means for dividing a signal resulting from the Fourier transform with respect to an azimuth of the antenna-received electric field signal by a signal resulting from the Fourier transform with respect to an azimuth of the received electric field pattern in the presence of one point source wave of the antenna; and a means for passing the signal divided at the means for dividing through a low-pass filter with respect to an azimuthal frequency and then subjecting it to a Fourier inverse transform with respect to an azimuth; the signal after the Fourier inverse transform being outputted as a final antenna output.

In an radio wave receiving apparatus where the pointing direction of antenna beam is moved. $\theta$ is an azimuth $g(\theta)$ is an antenna pattern and $f(\theta)$ is a wave source distribution function, an antenna-received electric field $e(\theta)$ is given by the form of a convolutional integral as in the equation (1):

$$e(\theta) = \int f(\Phi) \cdot g(\theta - \Phi) d\Phi \qquad (1)$$

It should be noted that $f(\Phi)$ in the equation (1) is identical to the wave source distribution function $f(\theta)$, and $\Phi$, representing an integral variable (an expedient variable in the integral equation), has the same units of azimuth as $\theta$.

In general, the antenna pattern $g(\theta)$ is measured as an electric field received at the antenna in the presence of one point source of wave. Here, supposing $E(\omega)$, $F(\omega)$, $G(\omega)$ as the functions resulting from Fourier transform with respect of azimuth, respectively, of $e(\theta)$, $f(\theta)$, $g(\theta)$, i.e., as azimuthal frequency functions, the equation (1) may be represented by the form of a multiplication as in the following equation (2):

$$E(\omega) = F(\omega) \cdot G(\omega) \qquad (2)$$

where $G(\omega)$ is an azimuthal frequency function of antenna pattern, i.e., a transfer function in respect of azimuthal frequency of the antenna. Since the antenna pattern $g(\theta)$ is determined when the antenna to be used is decides, $G(\omega)$ can be obtained by calculation from $g(\theta)$. Further, $E(\omega)$ is an azimuthal frequency function of the antenna-received electric field $e(\theta)$ and can be obtained by calculation from a measured value of the electric field signal $e(\theta)$ received by the antenna at each pointing angle. Accordingly, $E(\omega)$, $G(\omega)$ are known and the azimuthal frequency distribution function $F(\omega)$ of the wave source can be obtained by $$F(\omega) = E(\omega) / G(\omega) \qquad (3)$$

As described above, $F(\omega)$ is the Fourier transform with respect to an azimuth of the distribution function $f(\theta)$ of wave source. It is therefore possible to obtain the wave source distribution function $f(\theta)$ by a Fourier inverse transform with respect to an of azimuth of $F(\omega)$ which is represented by the equation (3). Accordingly, with the radio wave receiving apparatus having the above construction according to the present invention to which the above technique is applied, an equivalent resolution can be obtained as that of an antenna possessing its antenna pattern represented by the Dirac delta function.

BRIEF DESCRIPTION OF THE DRAWINGS

FIG. 1 is a block diagram showing an embodiment of the radio wave receiving apparatus according to the present invention.

FIG. 2 is a block diagram showing an example of the signal processing circuit in the embodiment shown in FIG. 1.

DESCRIPTION OF THE PREFERRED EMBODIMENT

Figure 3:
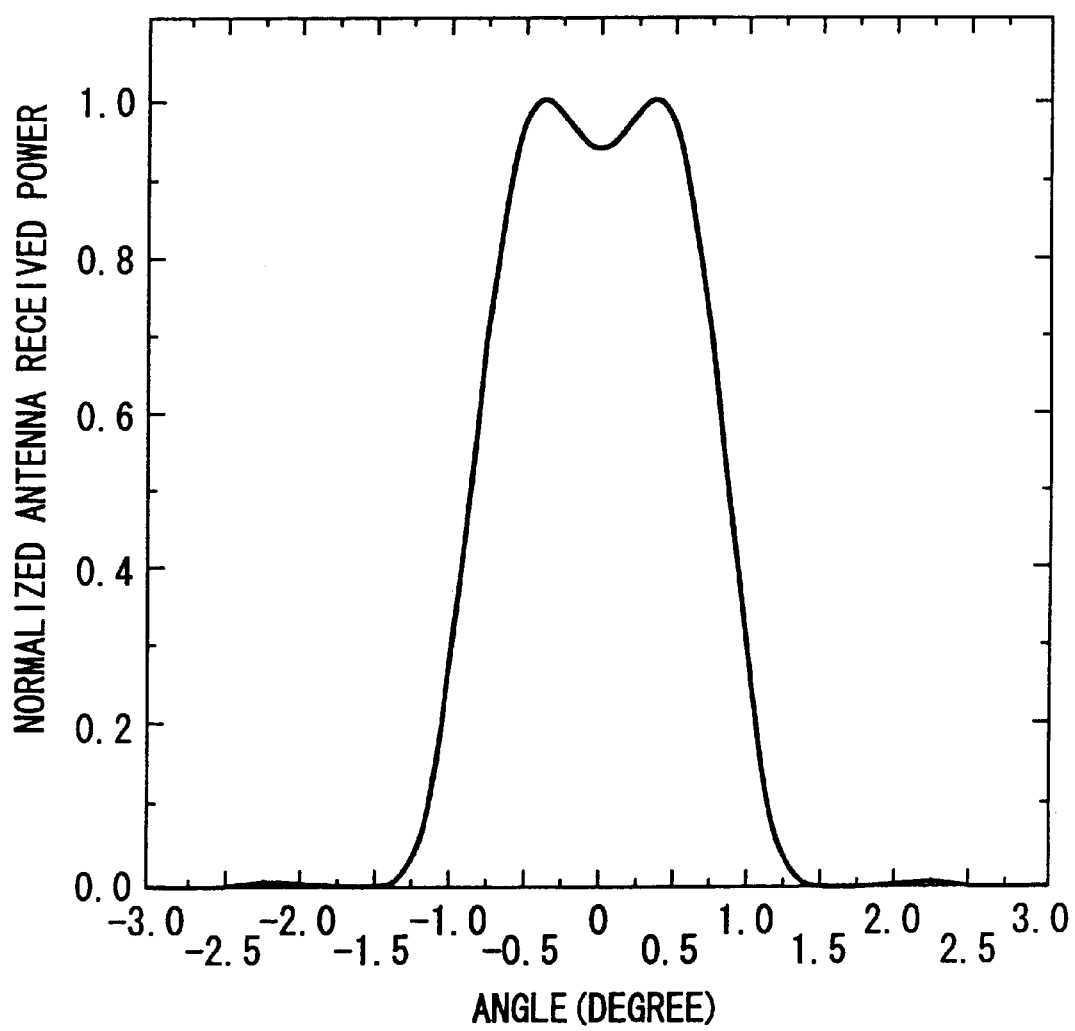
FIG. 3 shows the result of a simulation of antenna-received power response by an ordinary radar apparatus.

An embodiment of the present invention will now be described. FIG. 1 is a schematic block diagram showing an embodiment where the radio wave receiving apparatus according to the present invention is applied to a radar apparatus. Referring to FIG. 1, numeral 1 denotes an antenna for transmitting and receiving radio waves, which may be of any type, such as dipole antenna, horn antenna, parabola antenna, array antenna, etc. An antenna rotating device 2 rotates the antenna toward directions in which the antenna resolution is improved. A changeover switch 3 switches the connection between the antenna 1 and a transmitting circuit or a receiving circuit to be described below. Numeral 4 denotes a transmitting circuit, the transmitting power outputted from the transmitting circuit 4 being transmitted from the antenna 1 by way of the changeover switch 3. A receiving circuit 5 converts an radio wave received at the antenna 1 into an electric field signal. Numeral 6 denotes a signal processing circuit, which as shown in FIG. 2, includes: a means 6-1 for accepting a signal of angle from the antenna rotating device 2 and effecting a Fourier transform with respect of azimuth of an electric filed signal outputted from the receiving circuit 5; a means 6-2 for effecting a Fourier transform with respect to an azimuth of the antenna pattern related to radar of the antenna 1; a means 6-3 for dividing the electric field signal after the Fourier transform by the antenna pattern signal after the Fourier transform; a low-pass filter 6-4 for effecting a low-pass filter processing of the divided signal with respect to an azimuthal frequency; and a means 6-5 for effecting a Fourier inverse transform with respect to an azimuth of a signal passed through the low-pass filter 6-4; the signal after the Fourier inverse transform being outputted as a final antenna output.

A description will now be given with respect to the operation of a radar apparatus to which the radio wave receiving apparatus according to the present invention constructed as described above. A radio wave corresponding to the antenna pattern is transmitted from the antenna 1 while rotating the antenna 1. When the radio wave transmitted from the antenna 1 is returned as reflected by a scattering object, a received radio wave corresponding to the antenna pattern is outputted by the antenna 1. The received radio wave is converted into a receiving electric field signal at the receiving circuit 5 and then inputted to the signal processing circuit 6. In the signal processing circuit 6, a Fourier transform processing of the electric field signal is effected at the Fourier transform mean 6-1 and it is then divided at the division means 6-3 by an antenna pattern signal which has been subjected to a Fourier transform at the Fourier transform means 6-2. It is then passed through the low-pass filter 6-4 so as to be subjected to a Fourier inverse transform at the Fourier inverse transform means 6-5, the output thereof being outputted as a final output. A distribution function of scattering object (wave source) can thus be obtained in the above described manner.

Figure 4:
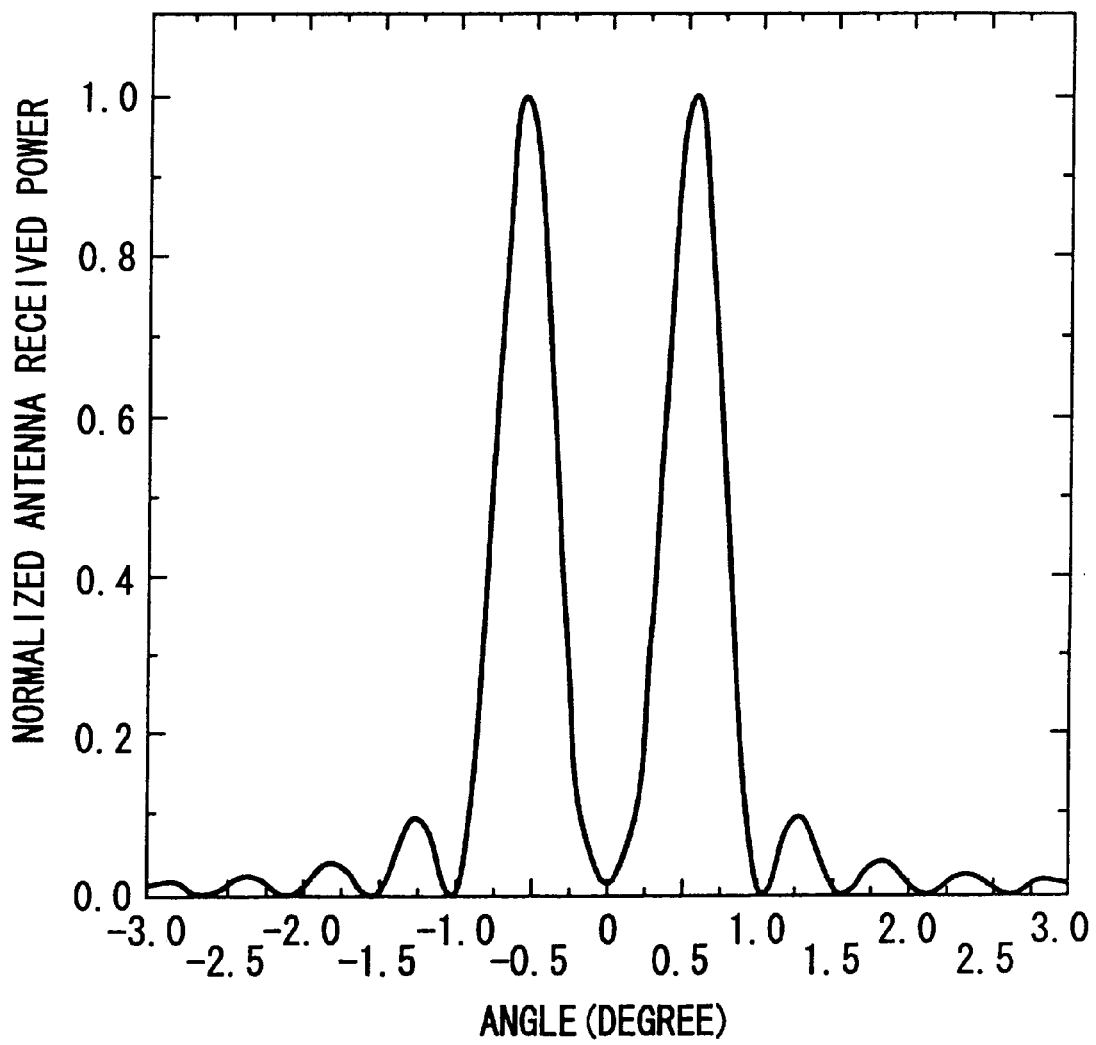
FIG. 4 shows the result of a simulation of antenna-received power response by the radio wave receiving apparatus according to the present invention.

FIGS. 3 and 4 each show a simulation result of the antenna receiving power pattern in the presence of two points of scattering objects regarded as radio waves identical to each other and separated by 1 degree at an equal distance from the antenna, in the case where the antenna 1 is rotated by using as the antenna 1 an aperture antenna (antenna beamwidth: 1 degree) having a uniform distribution of the antenna length in rotating direction being 50.8 times the wavelength. FIG. 3 shows the antenna receiving power response of an ordinary radar apparatus without any processing of the received signal. FIG. 4 shows the antenna receiving power response in the case of effecting the signal processing for improving the resolution according to the present invention. It should be noted that, in FIGS. 3 and 4, the power value normalized by the maximum value of respective antenna receiving power response is shown in relation to angle.

As can be seen from these figures, while it is difficult to determine the presence of two scattering objects from the response in the ordinary radar apparatus, effecting the signal processing for improving the antenna resolution according to the present invention results in a response from which it is clearly determined as the presence of scattering objects approximately at −0.5 degree and at +0.5 degree. In other words, an improvement in antenna resolution is seen.

While the above embodiment has been described as one using a mechanical antenna rotating device as the means for moving the pointing direction of the antenna beam toward directions for improving resolution, those which can be used as the means for moving the pointing direction of the antenna beam include: an electronic antenna beam scanning means; a means mounted on a traveling body, such as aircraft, for moving the antenna beam by moving the position of the antenna; etc.

As has been described by way of the above embodiment, in accordance with the present invention, a Fourier transform signal in respect of azimuth of an electric field received at the antenna is divided by a Fourier transform signal in respect of azimuth of the antenna pattern. The divided signal is passed through a low-pass filter in respect of azimuthal frequency and the passing signal is subjected to a Fourier inverse transform in respect of azimuth, the signal resulting from the inverse transform being outputted as a final output signal. It is thus possible to directly obtain a wave source distribution function and, hence, the antenna resolution can be improved.

What is claimed is:

1. A radio wave receiving apparatus having an antenna for receiving radio waves and a means for moving the pointing direction of an antenna beam of the antenna toward directions for improving resolution, said radio wave receiving apparatus comprising:

means for effecting a Fourier transform with respect to an azimuth of a received electric field signal obtained from the antenna while moving said antenna beam;

means for effecting a Fourier transform with respect to an azimuth of a received electric field pattern of the antenna in the presence of one point wave source;

means for dividing a signal resulting from the Fourier transform with respect to an azimuth of said antenna received electric field signal by a signal resulting from the Fourier transform with respect to an azimuth of said received electric field pattern of the antenna in the presence of one point wave source; and means for passing the signal divided at the means for dividing through a low-pass filter with respect to an azimuthal frequency and then subjecting it to a Fourier inverse transform with respect to an azimuth, wherein the signal resulting from said Fourier inverse transform is outputted as a final antenna output.

2. The radio wave receiving apparatus according to claim 1, wherein said means for moving the pointing direction of an antenna beam comprises an antenna rotating device.

3. The radio wave receiving apparatus according to claim 1, wherein said means for moving the pointing direction of an antenna beam comprises and electronic antenna beam scanning device.

4. The radio wave receiving apparatus according to claim 1, wherein said means for moving the pointing direction of an antenna beam comprises an antenna moving device.

* * * * *